US008125921B2

(12) United States Patent  
Frenger et al.

(10) Patent No.: US 8,125,921 B2
(45) Date of Patent: Feb. 28, 2012

(54) MOBILE STATION COMMUNICATING WITH A BASE STATION VIA A SEPARATE UPLINK WHEN THE PARAMETERS OF CHANNEL QUALITY FALL BELOW THE PREDEFINED THRESHOLDS

(75) Inventors: Pål Frenger, Linköping (SE); Per Magnusson, Linköping (SE); Niclas Wiberg, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 12/514,900

(22) PCT Filed: Nov. 17, 2006

(86) PCT No.: PCT/SE2006/001314
§ 371 (c)(1),
(2), (4) Date: May 14, 2009

(87) PCT Pub. No.: WO2008/060201
PCT Pub. Date: May 22, 2008

(65) Prior Publication Data
US 2010/0054145 A1 Mar. 4, 2010

(51) Int. Cl.
*H04J 1/16* (2006.01)
*H04W 4/00* (2009.01)
(52) U.S. Cl. ....................................... 370/252; 370/328
(58) Field of Classification Search .................... None
See application file for complete search history.

(56) References Cited

U.S. PATENT DOCUMENTS

| 5,734,833 | A | 3/1998 | Chiu et al. | |
| 6,539,028 | B1 | 3/2003 | Soh et al. | |
| 6,643,318 | B1 | 11/2003 | Parsa et al. | |
| 7,068,676 | B1* | 6/2006 | Sugaya et al. | 370/445 |
| 7,372,867 | B2* | 5/2008 | Ginzburg et al. | 370/447 |
| 2003/0026353 | A1* | 2/2003 | Chen et al. | 375/316 |
| 2004/0022223 | A1* | 2/2004 | Billhartz | 370/338 |
| 2004/0143681 | A1* | 7/2004 | Benveniste | 709/249 |
| 2004/0228282 | A1* | 11/2004 | Bao et al. | 370/252 |
| 2005/0276252 | A1 | 12/2005 | Sizeland et al. | |
| 2006/0221999 | A1* | 10/2006 | Bachrach et al. | 370/465 |
| 2008/0095185 | A1* | 4/2008 | DiGirolamo et al. | 370/464 |
| 2009/0252053 | A1* | 10/2009 | Leith et al. | 370/252 |

FOREIGN PATENT DOCUMENTS
WO 01/05050 A1 1/2001
WO 03/36821 A1 5/2003
* cited by examiner

*Primary Examiner* — Andrew Lee
(74) *Attorney, Agent, or Firm* — Coats & Bennett, P.L.L.C.

(57) ABSTRACT

The invention discloses a mobile station (200), a base station (300), a method and a computer program for communication in a wireless communication network (100), where cell edge user experiencing difficulties on the contention-based channel are treated differently than those users who are not power limited and/or do not experience collisions. Suggested solutions to this problem may be different treatment of the cell edge users in contrast to users located closer to the base station (300) either by communication over an orthogonal scheduled channel, or by forcing mobile stations (200) who have successfully sent their data to wait a specific time period or by dividing the mobile stations (200) into different groups based on the signal attenuation experienced by the different mobile stations (200).

38 Claims, 8 Drawing Sheets

MOBILE STATION COMMUNICATING WITH A BASE STATION VIA A SEPARATE UPLINK WHEN THE PARAMETERS OF CHANNEL QUALITY FALL BELOW THE PREDEFINED THRESHOLDS

TECHNICAL FIELD

The present invention is related to a resource allocation scheme in wireless communication networks.

BACKGROUND OF THE INVENTION

Throughout the development of wireless communication networks, which also include mobile and ad-hoc communication networks, the issue of efficient distribution of radio resources to the users using the radio link has been the subject of different optimization schemes. The parameters relevant in such an optimization scheme are user throughput, delay time, and fairness of distribution of radio resources. Usually, the different optimization schemes aim at maximizing one of these parameters, since they are in conflict. The signaling performed in distributing radio resources to users in a wireless communication network is usually controlled by the MAC (Media Access Control) layer, which is responsible for administrating the access to the radio link among the different users.

Two commonly used traditional UL MAC (Uplink Media Access Control) protocol principles are scheduled access and contention based access to the radio channel. The benefit of using a contention based UL MAC protocol is that any user can start to transmit as soon as there is data to send. This property gives contention based UL MAC protocol an advantage of having low delays when the load is low (and hence the risk of transmissions from two or more users colliding is low). One important shortcoming of contention based MAC protocols are collisions, i.e. when two or more users in a cell or coverage area start transmitting data to the same user simultaneously. Examples of contention-based protocols are Aloha, Slotted Aloha, CSMA (Carrier Sense Multiple-Access), CSMA-CD (Carries Sense Multiple Access with Collision Detection), S-MAC (Sensor Media Access Control), T-MAC (Timeout Media Access Control).

However, when the load is high, a scheduled MAC protocol, such as TDMA (Time Division Multiple Access), TRAMA (Traffic-Adaptive Medium Access) or FLAMA (Flow-aware Medium Access Framework), performs better both in terms of delay, system throughput and collision probability. An UL MAC protocol often makes use of both contention based and scheduled resources. Typically, the users may transmit scheduling request messages on a contention based channel and then they are assigned a scheduled resource for the data transmission.

One such MAC protocol is suggested in Dahlman, E. et al "A Framework for Future Radio Access", aimed at distributing radio resources among users in a WINNER wireless communication network, where several users share an uplink channel where transmission may be either contention-based or scheduled. Users may transmit resource requests on a contention-based channel while the base station may respond by assigning the corresponding users resources for future data transmissions on a scheduled channel. Users may also piggyback scheduling requests onto ongoing data transmissions on the uplink scheduled channel.

Furthermore, U.S. patent application no. US2006/0050742 describes a wireless communication system where a superframe structure in the time domain, that consists of contention based transmission periods (time slots) and contention-free transmission periods is suggested. During the contention-free transmission periods, the users transmit on scheduled channels, while they compete during the contention based periods.

One other contention and scheduling based MAC protocol is described in the U.S. patent to Wright et. al. no. U.S. Pat. No. 6,240,083, where a base station periodically sends out a control message on a broadcast channel to all mobile devices on the radio link. Such a control message includes the type and size of a transmission window for the uplink channel and the identifiers of the mobile devices the transmission window is allocated to. The MAC protocol disclosed in U.S. Pat. No. 6,240,083 is however very CDMA-specific.

Usually, when two users collide on a contention based channel the base station may only be able to decode the strongest signal correctly. But the weaker signal will typically not be decoded and the message will have to be retransmitted again after some (typically random) time duration. If the signals colliding have about equal received power there is a high probability that both signals are lost in the collision. But since both users retransmit their messages again after some (random) waiting times the chance that the same users will collide again can be made low. This is for example described in the two patent documents US2006/0050742 and U.S. Pat. No. 6,240,083

The MAC protocols described above, however, have one problem in common. In the event that a user is located far away from the base station the signal will always be received with low power. If the load in the system is high then there is a high probability that the cell edge user will almost always collide with the transmission of some other cell center user that is received with higher power. Even if some kind of (open loop or closed loop) power control is deployed to balance the received powers from nearby and far away users there will always be users that have reached their power limit and therefore can not increase their transmit power any more. In such power limited scenarios the message from the cell edge user will have a hard time reaching the base station when the load is high, since it will always lose in the contention with the other users closer to the base station. This puts an unnecessary limit on the system coverage.

The object of the present invention is therefore to resolve at least some of the problems with known technology.

SUMMARY OF THE INVENTION

This object is achieved by a mobile station for communication in a wireless communication network comprising at least one receiver and at least one transmitter, a first unit for monitoring activity in the communication network, a second unit for detecting collisions in the communication network and a third for determining parameters indicative of the channel quality on a radio channel, where the mobile station is arranged to communicate with a base station in the wireless communication network via a separate radio channel when the parameters indicative of the channel quality on a radio channel fall below a predefined threshold value and/or when an estimated probability of collisions passes a predefined threshold value.

The advantage of such a mobile station is that it is possible for the mobile station to communicate with the base station without competing for radio resources with other mobile stations in the coverage area of the base station which are closer to the base station and therefore not power-limited. One other advantage of the mobile station according to the present invention is that there is no need to design the system for the worst case scenarios where cell edge users must be able communicate on non-orthogonal channels. This will result in better coverage for the system which will translate to lower system cost.

It may be added, that the separate channel on which the mobile station and base station above may establish a communication may be an orthogonal scheduling request channel.

The mobile station may also be arranged to, based on the detected collisions, wait for the base station to establish a separate radio channel for communication between the mobile station and the base station. If however, the establishment of the separate radio channel has been unsuccessful, the mobile station may, based on the detected collisions, transmit a resource scheduling request over a RACH (Random Access Channel) to the base station. This may be useful in cases where the traffic conditions on the radio channel between the mobile station and the base station are difficult due to high load in the network, for example. Using a RACH as an alternative channel would bring the advantage that the mobile station in such cases would still reach the base station, since the RACH is mostly used for control signalling and is likely not overloaded.

According to another aspect of the present invention, the object of the invention is achieved by a mobile station for communication in a wireless communication network comprising at least one receiver and at least one transmitter, a device for monitoring activity in the communication network, a device for detecting collisions in the communication network and an arrangement for determining parameters indicative of the channel quality on a radio channel, where the mobile station is arranged to transmit a radio resource request when it has no data to send.

According to one embodiment of the mobile station according to the present invention, the radio channel may comprise a contention-based channel.

The radio resource request may for example comprise a resource scheduling request which in some cases may comprise a scheduling request for presumed future radio resource needs.

Thus, in contrast to known technology, the mobile station experiencing collisions or likely to experience collisions will anticipate future resource needs and signal them to the base station. This increases the likelihood of radio resources being available to the mobile station in question, when at some later point there is data to transmit.

Apart from that, the mobile station may further comprise at least one transmit buffer and be arranged to transmit the scheduling request when the at least one transmit buffer is empty.

According to one embodiment of the mobile station above the mobile station may be arranged to, upon reception of a resource scheduling grant from the base station, check whether it has any data to send to the base station and where the mobile stations is further arranged to transmit a new resource scheduling request to the base station in case the mobile station upon reception of said resource scheduling grant does not have any data to transmit. In this fashion the likelihood of available radio resource will increase at the time when the mobile station experiencing collisions or likely to experience collisions actually has some data to transmit to the base station.

This new resource scheduling request may have a different format from the initially sent resource scheduling message with the data and be transmitted, for example, on a scheduled reservation channel.

According to another embodiment of the mobile station above, the radio resource request transmitted to the base station may comprises a priority flag indicating that the mobile station has no more data to send. Using the priority flag would also have the additional advantage that mobile stations having critical data to send will be given higher priority than mobile stations experiencing collisions which only have low-priority data to transmit.

It may be added here, that the mobile station according to the present invention mentioned above may be located at the edge of the coverage area for the base station. Usually, the mobile stations in this location will mostly likely collide with other mobile stations positioned closer to the base station or loose in the competition on the contention-base channel.

According to yet another aspect of the present invention the object of the invention is achieved by a base station for communication in a wireless communication network comprising at least one receiver and at least one transmitter; a first unit for monitoring activity in the wireless communication network; a second unit for detecting collisions in the communication network and a third unit for determining parameters indicative of the channel quality on a radio channel, where the base station is arranged to establish a scheduled radio channel to a mobile station whose channel quality falls below a predefined threshold value and/or whose probability of collisions passes a predefined threshold value.

This scheduled radio channel may, for example, comprise an orthogonal radio channel. In this way, the mobile stations having difficulties competing for resources on the radio channel will be detected by the base station and be able to obtain radio resources on a separate radio channel where they do not need to compete with other mobile stations less likely to experience collisions.

Naturally, it may be possible for the base station to check whether the one or more mobile stations have any data to transmit before establishing a scheduled radio channel to said the one or more mobile stations.

As far as the channel quality above is concerned, it may be be expressed in terms of SINR (Signal-to-Interference and Noise Ratio), ISI (Inter Symbol Interference), RSSI (Received Signal Strength Indicator), path loss, geometry factor, or some other parameter indicative of channel quality.

According to another aspect of the present invention, the object of the invention is achieved by a base station for communication in a wireless communication network comprising at least one receiver and at least one transmitter; a device for monitoring activity in the communication network; a device for detecting collisions in the communication network and an arrangement for determining parameters indicative of the channel quality on a radio channel, where the base station is adapted to receive data from one or more mobile stations in the wireless communication network and to force the one or more mobile stations to delay any further data transmission for a predefined waiting time period after a successful data transmission.

By doing this, the base station will prevent one or more mobile stations from constantly occupying the radio channel and to be able to distribute the available radio resources more evenly among the mobile stations in its coverage are or cell.

According to one other embodiment of the base station according to the present invention the base station may be adapted to receive data from other mobile stations in the wireless communication network during the predefined time period.

According to yet another embodiment of the base station according to the present invention the base station may be adapted to transmit information indicative of the waiting time period to one or more mobile station in the wireless communication network. Thus, each mobile station in the wireless communication network will know when to send its next data to the base station. This information may either be sent to directly to each mobile station which has successfully transmitted its data to the base station or together with ACK/NACK (Acknowledged/Not Acknowledged) signalling to one or more mobile stations in the wireless communication network.

One other possibility of sending the information about the waiting time for each mobile in the wireless communication network may be that the base station is adapted to transmit the information on a control channel This may for example be a dedicated or a broadcast channel.

Now, it may be also possible for the base station to treat the waiting time period mentioned above as a deterministic parameter or a random variable.

According to yet another aspect of present invention, the object of the invention is achieved by a base station for communication in a wireless communication network comprising at least one receiver and at least one transmitter; a first unit for monitoring activity in the communication network and a second unit for calculating parameters indicative of the signal quality for a received signal from one or more mobile station in the wireless communication network, where the second unit is arranged to gather one or more of the mobile stations whose signal quality has been measured to be below a predefined value into at least one first group of mobile stations and to gather one or more mobile stations whose signal quality has been measured to be above said predefined value into at least one second group of mobile stations where the base station is arranged to communicate with the at least one first group of mobile stations on at least one first radio channel and with the at least one second group of mobile station on at least one second radio channel.

This would have the advantage that mobile stations whose signal quality is low will compete with mobile station which also have comparably low signal quality and mobile station with high signal quality will compete with mobile stations having comparably high signal quality. Thus, the mobile station with high signal quality will not automatically win over those with low signal quality, and those with low signal quality will have a fair chance of obtaining scheduled radio resources from the base station.

According to one embodiment of the base station of the present invention above, the at least one first and second radio channels may be contention-based radio channels, which may or may not be orthogonal with respect to each other.

It may be possible according to another embodiment of the base station of the present invention to adapt the base station to force the mobile stations of the first group and the mobile stations of the second group to adapt their transmission power so as two even out the differences in signal attenuation between the first and second groups. This will give the mobile stations with low signal quality even better chances of obtaining scheduled radio resources from the base station.

According to yet another aspect of the present invention, the object of the invention is achieved by a method of allocating radio resources in a wireless communication network comprising the steps of a) monitoring user traffic on a radio channel,
b) gathering parameters indicative of the channel quality on the radio channel for one or more users in the wireless communication network,
c) based on the parameters indicative of the channel quality on the radio channel, establishing communication on a separate radio resource with one or more of said users for which the channel quality falls below a predefined threshold,
d) receiving resource scheduling requests on the separate radio resource and;
e) receiving data transmitted on the granted scheduled radio resource.

The advantages of the method according to the present invention are analogous to those of the mobile station and the base station according to the present invention.

According to one embodiment of the method of the present invention
step c) may further comprise the sub steps of
c1) issuing an orthogonal dedicated resource for said users in the wireless communication network.

According to yet another embodiment of the method of the present invention the users in the wireless communication network may only send resource scheduling requests on said orthogonal dedicated resource. This would have the advantage of reducing the load on the contention based channel normally used for sending resource scheduling requests.

According to yet another embodiment of the method of the present invention the issuing of an orthogonal dedicated resource may comprise issuing a persistent scheduling grant or a dedicated channel for the one of more users in the wireless communication network.

One equally possible embodiment of the method of the present invention may be that step c) may comprise allowing the users to periodically send a scheduling request on the separate radio resource and monitoring the persistent scheduling radio channel for user scheduled radio resource requests.

According to another aspect of the present invention, the object of the invention is achieved by a computer program product comprising instruction sets for
a) monitoring user traffic on a radio channel
b) gathering parameters indicative of the channel quality on the radio channel for one or more users in the wireless communication network
c) establishing communication on a separate radio resource with one or more of the users for which the channel quality falls below a predefined threshold based on the parameters indicative of the channel quality on the radio channel;
d) receiving resource scheduling requests on the separate radio resource and;
e) receiving data transmitted on the granted scheduled radio resource.

The computer program product is specially adapted to implement the steps of the method according to the present invention mentioned above.

These and other advantages of the present invention will be more readily understood from the following detailed description with reference to the accompanying drawings.

BRIEF DESCRIPTION OF THE DRAWINGS

Finally.

DETAILED DESCRIPTION OF PREFERRED EMBODIMENTS

Figure 1:
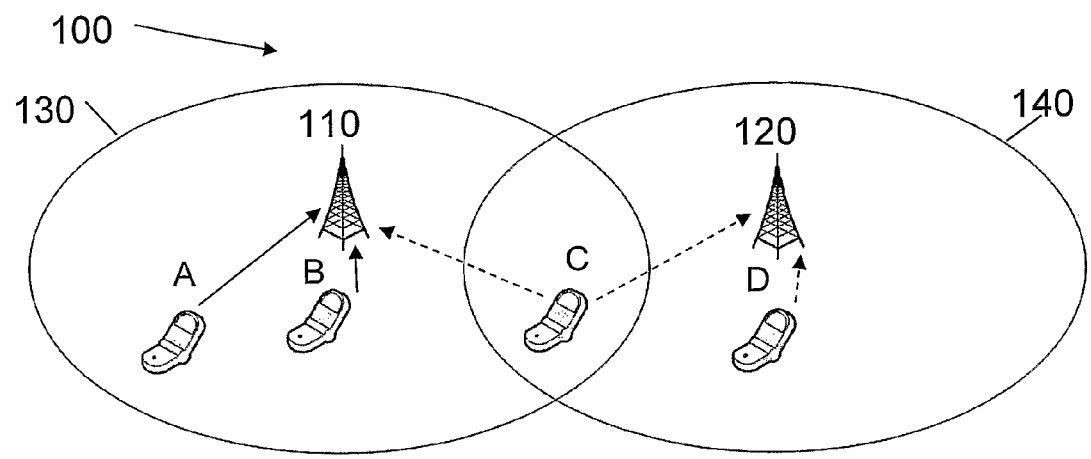
FIG. 1 illustrates the uplink collision problem in a wireless communication network.

FIG. 1 illustrates a common scenario in a wireless communication network 100 there a first and a second mobile station A and B are located near the center of the coverage area or cell 130 covered by the base station 110 and a third mobile station C is located at the cell edge, far away from the base station 110. The third mobile station C is also located at the edge of a second coverage area or cell 140 covered by a second base station 120. In this cell 140, a fourth mobile station D is located near the center of the cell 140. Now, if both mobile stations A and B need to transmit scheduled data at the same time and none of them have received a valid uplink transmission grant by the base station 110 they must both send a scheduling request to the base station 110 on a contention based channel in order to be assigned such a grant. If these scheduling request transmissions are transmitted at the same time on the same scheduling request channel they will collide and the base station may not be able to detect both scheduling request transmissions. In addition, if the third mobile station C is power-limited it will not be able to transmit a signal that is received at the base station 110 with a required SIR (Signal-to-Interference) level. In contrast, the signals from the first and second mobile stations A and B will experience much smaller path loss to the base station 110, since they are positioned at a shorter distance from it, and the signals transmitted from mobile stations A and B are therefore received with the required SIR level. In this case the mobile stations A or B will win the contention and the base station will be able to decode the scheduling requests sent from mobile stations A or B but not the scheduling request sent from the power limited mobile station C. In case of high load on the contention based scheduling request channel(s), the third mobile station C will almost always collide with some other user that has a smaller path loss and hence the third mobile station C will almost never win the contention and consequently not be assigned any uplink transmission grant on a scheduled (orthogonal) transmission channel. An identical scenario is likely to happen in cell 140, when the third mobile station C and a fourth mobile station D compete on the contention-based channel to send their resource scheduling requests to the second base station 120, since the fourth mobile station D is located near the center of the cell 140, while the third mobile station C is located near the edge of the second cell 140.

Figure 2:
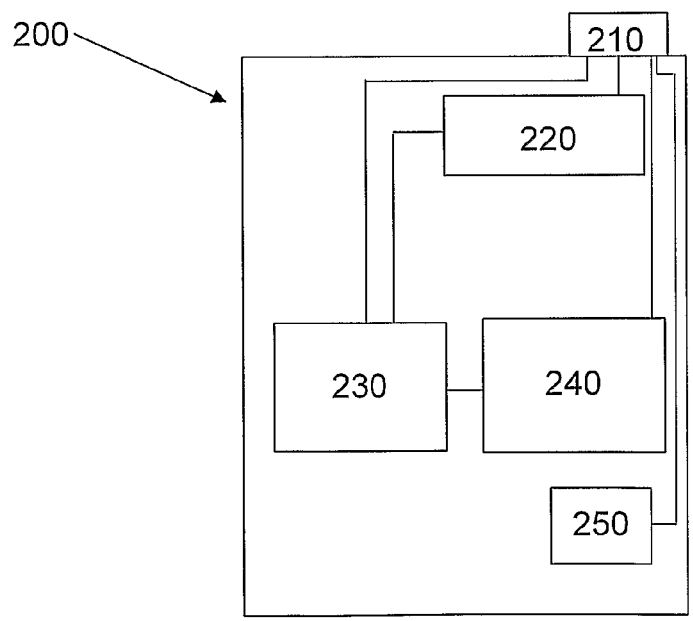
FIG. 2 shows an embodiment of a mobile station according to the present invention.

In FIG. 2 a schematical embodiment of a mobile station 200 according to the present invention is shown. In this example, the mobile station 200 is equipped with a receiver and transmitter 210 for receiving and sending data and control information. Naturally, the receiver and transmitter 210 may be also two separate units. Furthermore, the mobile station 200 may comprise a first unit 220 for monitoring activity in the wireless communication network 100 which may be capable of detecting whether other mobile station in the wireless communication network 100 are sending data, are operating in standby-mode or for example are in sleep-mode. This unit 220 is communication with the to receiver and transmitter unit 210 in the mobile station 200.

Also, the mobile station 200 may comprise a second unit 230 for detecting collisions in the wireless communication network 100 which is connected to the receiver and transmitter 210 and the first unit 220 for monitoring activity in the wireless communication network 100. One example of detecting a collision may be that no answer from the base station 110 was received when transmitting a resource reservation request message to the base station 110 and not receiving a resource grant message or when sending an RTS (Request to Send) message, but failing to receive a CTS (Clear to Send) message from the base station 110. The second unit 230 may in this case responsible to issue a collision information message or wait with the issuing of the collision information message until several such collisions have been registered during a predetermined span of time.

The mobile station 200 may comprise an additional third unit 240 for measuring the CQI (Channel Quality Indicator) on a radio channel when communication with a base station 110. Such a unit may measure any parameter from a signal received from the base station 110 which characterizes the channel quality, such as SINR (Signal to Interference and Noise Ratio), RSSI (Received Signal Strength Indicator), ISI (Inter-symbol Interference) or calculate the CQI from more than one of these parameters. This third unit 240 is then adapted to send the CQI via the receiver and transmitter 210 back to the base station. The activity monitoring unit 220 could also be connected to the CQI unit 240. Depending on how the CQI measuring is performed it might also provide some information about the activity.

Finally. the mobile station 200 may as well comprise a transmit buffer 250 where data that is going to be transmitted shortly is stored.

Figure 3:
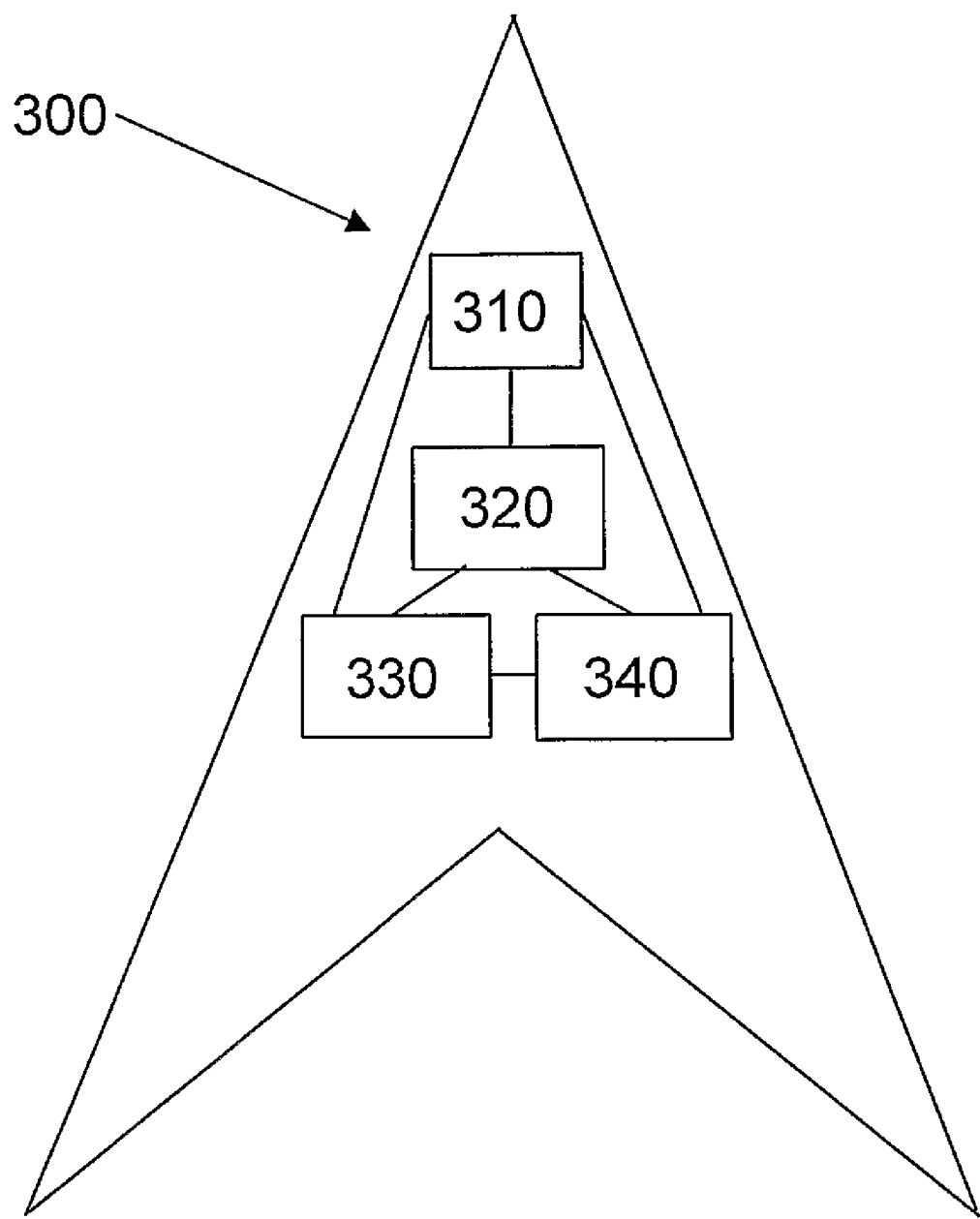
FIG. 3 shows an embodiment of a base station according to the present invention.

Turning now to FIG. 3, an embodiment of a base station 300 according to the present invention is presented. Similar to the mobile station 200 from FIG. 2, the base station 300 comprises a receiver and transmitter 310 for receiving and sending data and control information to mobile stations and other base stations. In this example, the base station 300 only comprises one receiver and transmitter 310, but it may equally comprise more than one receiver and transmitter for the purposes of reception and transmission diversity.

Additionally, the base station 300 may comprise a first unit 320 for monitoring activity in the wireless communication network 100, which, for example, via the receiver and transmitter 310 may detect the state of one or more mobile stations in the wireless communication network 100. These states may be transmitting, idle or sleep or some other state that mobile stations may be in.

Additionally, the base station may comprise a second unit 330 for detecting collisions in the communication network. This unit, which is connected to the receiver and transmitter 310 and possibly also to the first unit 320 for monitoring activity in the wireless communication network 100 has the role of detecting when one or more mobile stations collide in the wireless communication network 100 and to possibly establish an orthogonal channel to these mobile stations via which they will be able to transmit their radio resource reservation requests. This will be explained in more detail later in the description.

Apart from the first and second units 320 and 330 the base station 300 may also comprise a third unit 340 for determining parameters indicative of the channel quality on the radio channel. Similarly to the third unit 240 in the mobile station 200 from FIG. 2, this unit may either calculate the channel quality by measuring parameters, such as SINR, ISI, attenuation on the radio channel or some other parameter indicative of the channel quality by sending a test signal to one or more mobile station and determining these parameters from the response of the one or more mobile stations. Another possibility would be to perform the measurements directly on a data signal received from the one or more mobile stations. Using the measured parameters for one or more mobile station in the wireless communication network the second unit 330 may determine collisions or the likelihood of collisions for one or more mobile stations in the wireless communication network 100.

Moreover, the second unit 320 for monitoring activity in the wireless communication system is connected to the third and fourth units 330 and 340 for detecting collisions in the wireless communication network and for determining parameters indicative of the channel quality on the radio channel.

It may be added that the first, second and third units 320, 330 and 340 may also be integrated into one single unit. The advantage of integration would be the saving of space on a chip if the above units are constructed on an IC. Analogously, the first, second and third units 220, 230 and 240 in the mobile station 200 may also be integrated into one single unit in the same manner as described above.

Figure 4:
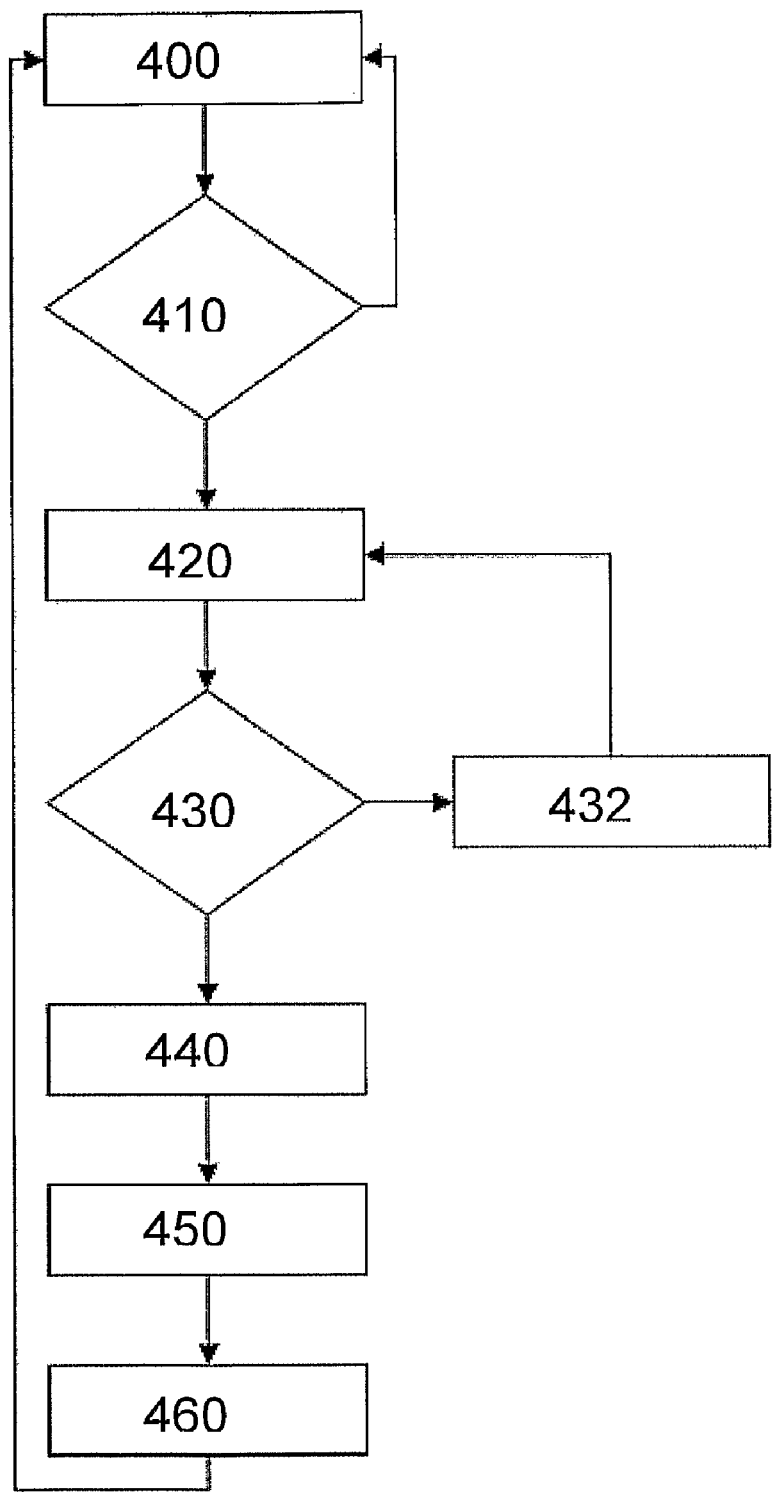
FIG. 4 illustrates a flow chart depicting the steps of a method according to a first embodiment of the present invention.

Turning now to FIG. 4, a flow chart illustrates the method steps of a first embodiment of a method according to the present invention, where the base station 110 from FIG. 1 takes on the active role of determining problems on the contention based scheduling channel.

At step 400, a base station, such as, for example, the base station 110 from FIG. 1 monitors traffic on a contention-based scheduling request channel. On this channel any mobile station is allowed to send at any time a scheduling request for radio resources it needs for transmitting data. The monitoring of the contention based channel may comprise detecting the CQI (Channel Quality Indicator) from each mobile station in the coverage area 130 of the base station 110.

Additionally, the base station 110 may detect the power in the data signal received from each mobile station and measure the attenuation on the radio channel. Using the power received from a mobile station and the measured attenuation the power limitation of a mobile station may be determined. Power limitation means that due to attenuation on the radio link a mobile station can only increase the transmit power up to a certain maximum transmit power limit, which in the case of high attenuation, leads to a situation when this maximum power is not sufficient to transmit a signal that is detected with a target SIR by the base station 110.

Other parameters which may be monitored by the base station may be based on the load on the radio link, i.e., how many percent of the available bandwidth are used for data transmission by the mobile stations in the coverage area of the base station 110, and on the activity of the mobile station or the base station 110, i.e. if the mobile stations or the base station are in transmit, idle, standby mode or some other activity mode.

If, at step 410, the above collected parameters indicative of the channel quality fall below a certain predefined threshold or if the data calculated from these indicates that one or more mobile stations have problems competing with other mobile stations in the cell 130 of the first base station 110, the base station 110 decides at step 420 to poll the corresponding power limited mobile stations. In this fashion, an orthogonal resource is assigned to these mobile stations on which they can communicate with the base station.

Now, if at step 430, the polled one or more mobile stations have data to transmit to the base station 110, the base station 110 receives a radio resource scheduling request on an orthogonal uplink resource at step 440 from one or more of the polled mobile stations.

Otherwise if none of the polled mobile stations have any data to transmit, the base station waits a predetermined amount of time at step 432 before it polls the one or more mobile stations again at step 420.

At step 440, the base station 110 receives on the newly assigned orthogonal resource a resource scheduling request from the one or more mobile stations detected as having problems with competing on the contention based channel.

Next, at step 450, the resource scheduling request from one or more of the mobile stations is granted reserving resource for data transmission for those mobile stations.

Finally, at step 460, the data transmitted from the mobile stations on the scheduled radio resources is received, whereafter the base station 110 returns to the monitoring of the contention based channel at step 400.

It may be mentioned here that the flow chart in FIG. 4 illustrates one cycle of the first embodiment of a method according to the present invention. Also, the flow chart depicts only the part of the communication between the base station 110 and one or more station relevant for the first embodiment of the method according to the present invention. Besides the monitoring the traffic on the contention-based channel at 400, the base station send and receives data from and to other mobile stations, which do not have collision problems on the contention-based channel.

Figure 5:
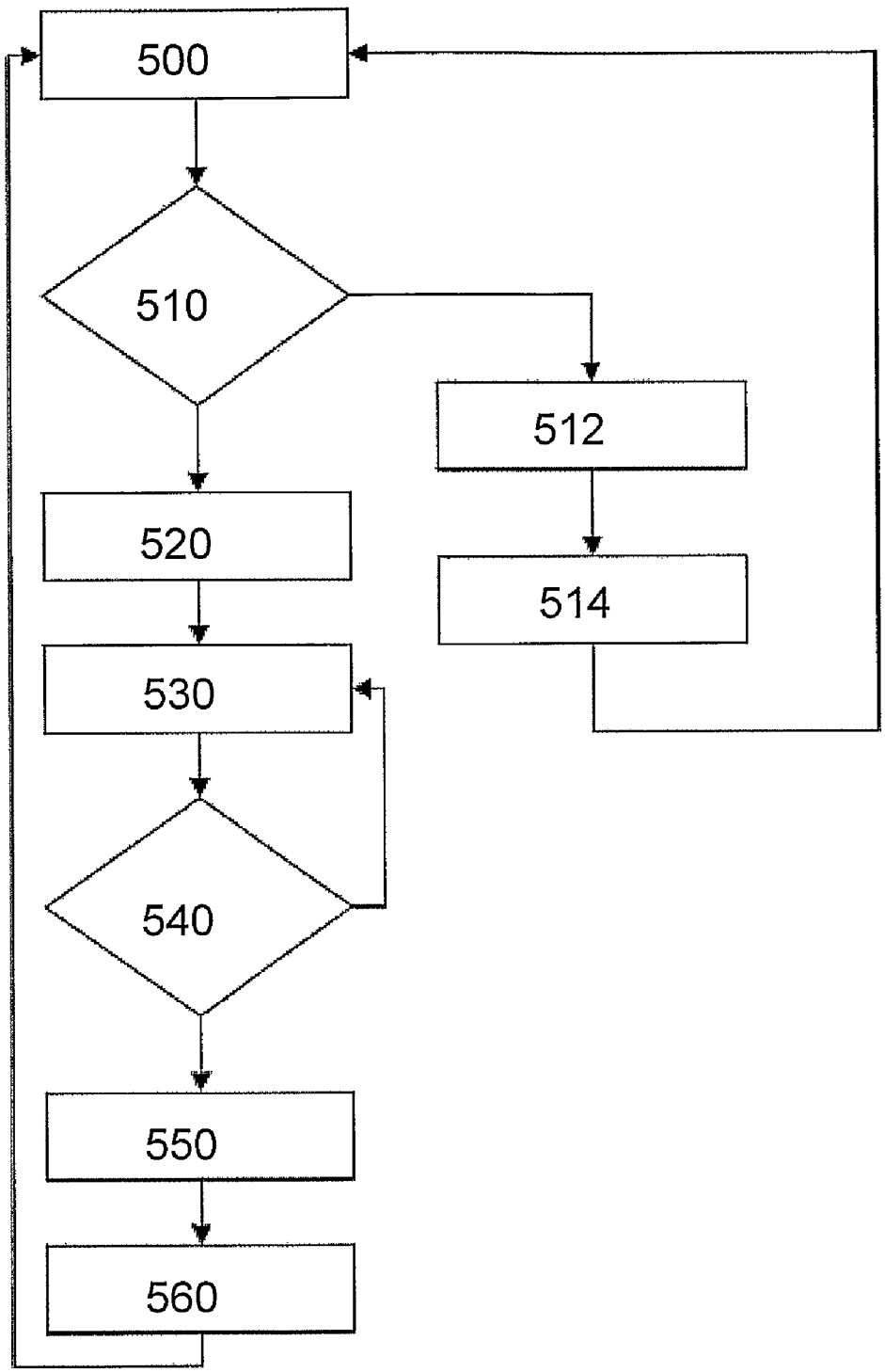
FIG. 5 illustrates a flow chart depicting the steps according to a second embodiment of a method of the present invention where persistent orthogonal resource request channels are allocated to users having problems competing on the contention based resource request channels in the wireless communication network.

FIG. 5 illustrates the steps of a second embodiment of a method according to the present invention, where the method of FIG. 4 is somewhat modified.

At step 500, analogously to the first embodiment in FIG. 4, the base station 110 monitors parameters indicative of the quality on the contention based scheduling request channel.

If there are mobile stations detected as having problems competing on the contention based channel at step 510, these mobile stations are assigned a persistent scheduling grant by the base station 110 on non-contention based scheduling request channels at step 520. In this fashion, a direct communication channel between the mobile stations having problems on the contention-based channel and the base station is established. These mobile stations no longer need to compete with their scheduling request with other mobile station having more favourable transmission conditions.

If, on the other hand, the base station 110 at step 510 has not detected any colliding mobile stations, it follows the usual procedure of granting resource scheduling requests to mobile stations at step 512 and receiving transmitted data from the mobile stations at step 514. Thereafter, the base station 110 returns to step 500, where it is monitoring channel quality parameters again.

At step 530, the base station 110 monitors the granted scheduling channel for periodical scheduling requests from mobile stations that have been assigned a persistent scheduling grant.

If a scheduling request has been received at the base station 110 on the persistent scheduling channel at step 540, then one or more mobile stations are assigned radio resources at step 550.

Finally, at step 560, data transmissions from the one or more mobile stations are received at the base station 110, whereafter the base station 110 returns to the channel monitoring step at 500. Of course, the base station is not only passively monitoring the contention based channel, but it is also receiving and transmitting data from and to mobile stations that do not experience collisions in the wireless communication network 100.

Figure 6:
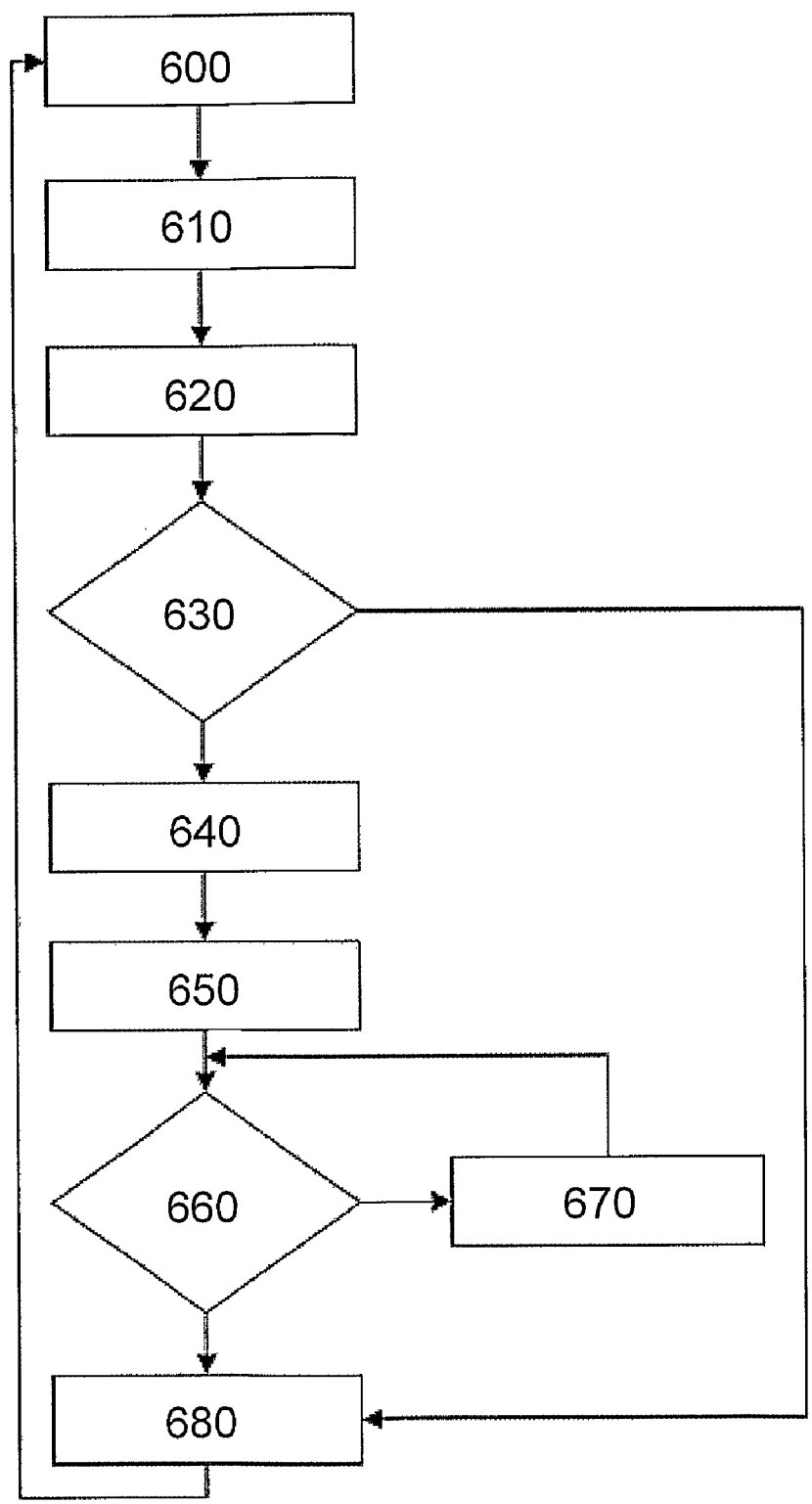
FIG. 6 illustrates a flow chart depicting the steps according to a third embodiment of a method of the present invention in which the mobile terminal piggy backs a resource request to a data transmission in the case when the mobile terminal has empty transmit buffers.

FIG. 6 illustrates the method steps of a third embodiment of a method according to the present invention. Here, the embodiment of the method is seen from the perspective of the mobile station competing on the contention based resource scheduling request channel At step 600, the one or more mobile stations (B) transmit a resource scheduling request to a base station 110.

In the next step 610, the one or more mobile stations receive a resource grant from the base station 110 as an answer.

At the same time, the one or more mobile stations monitor the conditions on the uplink channel at step 620.

If at step 630, they become aware of difficult transmission conditions on the radio link, i.e. they frequently experience collision on the contention based channel, they choose to "piggyback" a scheduling request together with the data they intend to transmit on the uplink at step 640. This piggybacked scheduling request comprises a resource request for presumed future radio resource needs in case they are needed.

It is worthwhile mentioning here, that the piggybacked scheduling request is issued when the transmit buffers of the mobile station in question are empty. The requested resource may be of such small size that it only supports transmission of a future scheduling request. The base station may treat these requests for future orthogonal scheduling request resources differently than normal scheduling requests for data transmissions, i.e. by allowing a larger delay before granting a request to a user reports that it has an empty transmit buffer. In contrast, piggybacked scheduling requests in prior art systems are sent only when the transmit buffer of the mobile station contain data to be sent.

Otherwise, should the one or more mobile stations not experience any collisions on the uplink contention based scheduling request channel they proceed at step 680 with transmitting their data to the base station 110.

Then, at step 650, the mobile station B receives a resource grant from the base station 110.

In the next step 660, and before sending any data to the base station 110, the one or more mobile stations check whether they have any data to send.

In the case that there is no data to send, the mobile station sends again a resource scheduling request for resources it may need in the future at step 670. It should be mentioned here, that, since this time the one or more mobile stations have no data to send, they may choose to send the resource scheduling request message in a different message format since the amount of information that needs to be included in the resource request message is smaller than in the normal case when there is data to send. Information about buffer status and priority of the data are not needed in case there is no data in the transmit buffers.

If, however, there is data to send, the mobile station proceeds at step 680 with transmitting data to the base station 110.

Thereafter, the entire procedure returns to the initial step 600.

It may be noted however that it is also possible, and known in prior-art, to use piggybacked resource requests when a mobile station is not able to empty the transmit buffer by using the currently granted resource, regardless of whether there are collision problems on the uplink channel or not. In the case when the one or more mobile stations have more data to transmit they can always choose to add a scheduling request to the current transmission. This is done since it is faster and more robust. However, in contrast to known technology, a scheduling request in step 670 is transmitted when the transmit buffer is empty and step 670 is performed only by mobile stations that experience collision problems on the contention based scheduling request channel Note however, that usually, there is a time gap for the one or more mobile stations before they return to step 600, since in this embodiment of the method according to the present invention the one or more mobile stations will only transmit a resource request at step 600 when there is data to send to the base station 110.

Additionally, the one or more mobile stations may add a priority flag to the resource scheduling request (not shown), where the priority flag may indicate the probability that the one or more mobile station will actually have data to send when they are allocated the scheduled resource by the base station 110.

Equally feasible would it be that some mobile stations send a priority flag together with their resource scheduling requests and some not. In this fashion, the base station 110 may then delay the resource grant for those one or more mobile stations whose resource scheduling requests do not contain any priority flag, i.e. giving them low priority, and favour the priority flagged resource scheduling requests. First when all the priority flagged resource scheduling requests have been handled, the base station starts granting resource scheduling requests from those one or more mobile stations sent without priority flags. However, when the load on the uplink radio channel is high, it will take longer for those mobile stations to receive a resource grant from the mobile station 110.

Figure 7:
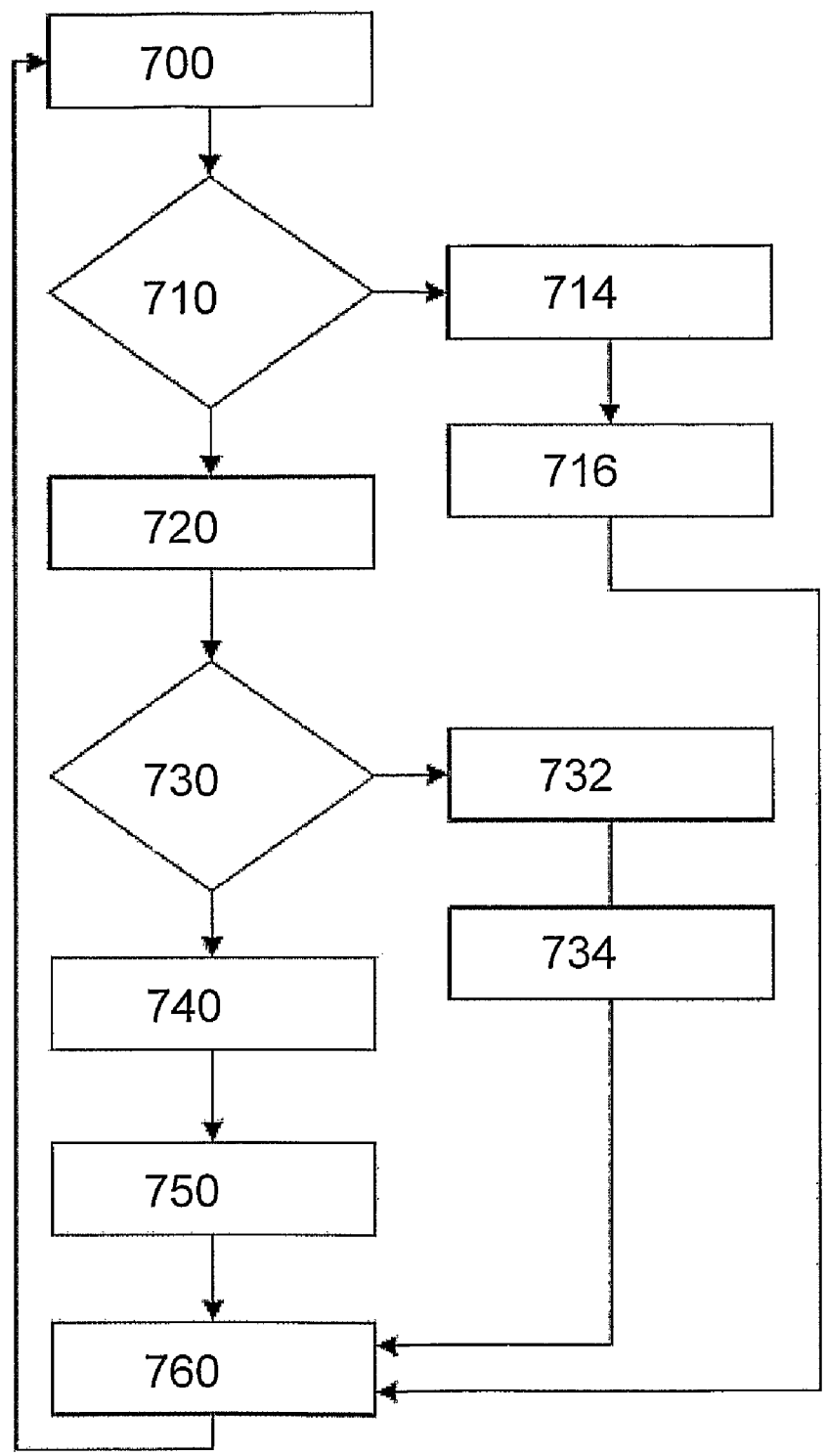
FIG. 7 illustrates a flow chart depicting the steps needed to perform user initiated polling according to a fourth embodiment of the present invention

FIG. 7 illustrates the method step of a method according to a fourth embodiment of the present invention from the perspective of one or more mobile stations in the wireless communication network 100.

Analogously to the previous embodiments, the one or more mobile station monitor the traffic conditions on the uplink contention based channel at step 700.

If at step 710, the one or more mobile stations detect that they have difficulties reaching the base station 110 and that they often collide on the contention base channel, the one or more mobile stations wait a predefined amount of time at step 720 to be contacted by the base station 110 and to be assigned an orthogonal uplink channel.

Otherwise, if the communication with the base station 110 proceeds without collisions, the one or more mobile stations send a resource scheduling request to the base station 110 at step 714. At step 716, the one or more mobile stations receive a scheduling grant and transmit their data to the base station 110 at step 760.

Now, should at step 730 the predefined amount of time be exceeded with no polling from the base station 110, which for various reasons may occur, the one or more mobile stations send a resource scheduling request on the RACH (Random Access Channel) at step 732. Then, at step 734, the one or more mobile stations receive a resource scheduling grant from the base station and proceed to transmit data to the base station 110 at step 760.

The base station may not poll the users who collide on the contention-based channel due to, for example, high load on the uplink scheduling channel or due to scheduling requests from other mobile stations having higher priority traffic to send.

Also, the RACH should be designed in order to allow all users to send their scheduling requests. Typically, the probability of a collision on a RACH is much lower than on other contention-based channel designed for sending resource scheduling requests or data. Additionally, the amount of radio resources for a RACH is low and the number of random access messages is typically much less than the number scheduling request messages on other contention-based channels.

If, on the other hand, the one or more mobile stations do receive a message from the base station during the predefined waiting time period, the one or more mobile stations send at step 740 a resource request to the base station 110 on an orthogonal scheduling channel reserved by the base station At step 750, the one or more mobile stations receive a resource scheduling grant from the base station 110 on the orthogonal scheduling channel mentioned earlier.

Finally, at step 760, the one or more mobile stations transmit their data to the base station 110, whereafter the one or more mobile station return to the monitoring step 700.

Figure 8:
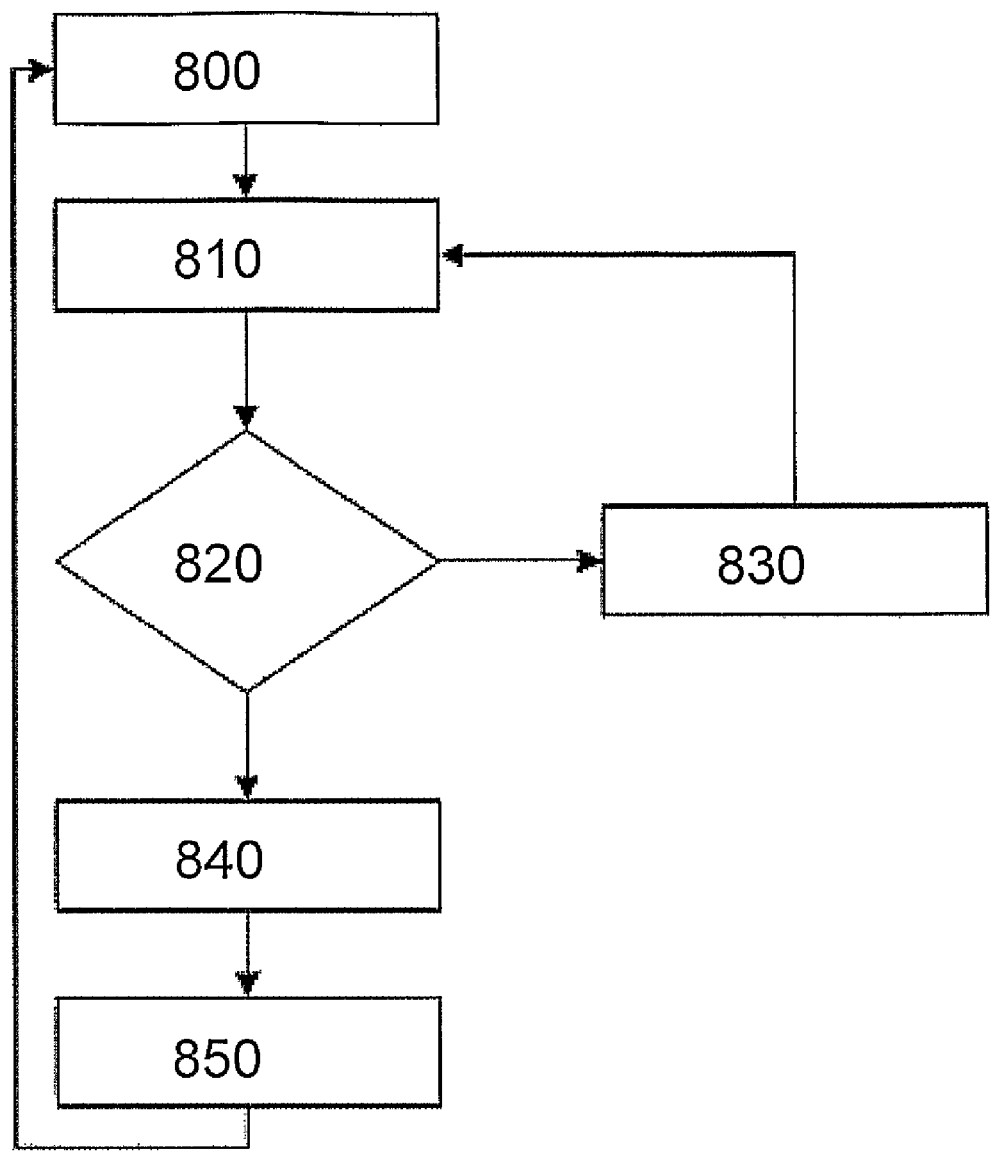
FIG. 8 illustrates a flow chart depicting the steps needed to perform delay time-controlled data transmission according to a fifth embodiment of a method according to the present invention.

Turning now to FIG. 8, the method steps of a method according to a fifth embodiment of the present invention are illustrated.

Here, analogously to some previous embodiments of the method according to the present invention, the base station monitors the uplink scheduling request channel at step 800.

At step 810, the base station 110 receives data from the one or more mobile stations. If the data transmission has been completely and correctly received at step 820, the base station 110, forces at step 840 the one or more mobile stations that have successfully transmitted their data to delay any further data transmissions and transmissions of resource requests for a predefined time period.

This predefined time period or waiting time may be either a deterministic parameter that depends on the system load or a random variable, where, for example, in the case the system load may be characterized by a Gaussian distribution, the mean value and the variance depend on the system load. The waiting time may be either broadcast by the base station 110 on the downlink or it may be signalled directly to each mobile station in question.

As an alternative, the base station 110 may calculate the waiting time for each of the one or more mobile stations that have successfully transmitted their data to the base station 110 and send it to the mobile station in question via a control channel (not shown).

As a further alternative, the base station 110 may signal the waiting time parameters together with ACK/NACK (Acknowledged/Not Acknowledged) signalling that is sent in the downlink channel to control the uplink HARQ (Hybrid Automatic Repeat Request). This would assure that the system always has resources available on the contention-based non-orthogonal resources for transmitting scheduling requests.

In case the data transmission for one or more of the mobile stations in the coverage area of the base station 110 has not been successful, the base station 110 issues an ARQ-command in step 830 (ARQ—Automatic Repeat Request) to one or more of the mobile stations in question. Then, the one or more mobile stations transmit their data again at step 810.

Finally, after the waiting time period has passed for the one or more mobile stations at step 850, the base station 110 receives data transmitted by these mobile stations and returns to the monitoring step 800 where it monitors the traffic conditions on the contention-based channel again.

Naturally, the method steps described in FIG. 8 only describe a part of the activities of the base station 110, which besides monitoring the contention based channel at step 800 also comprise receiving and transmitting data from and to one or more of the mobile stations in the wireless communication network 100.

Figure 9:
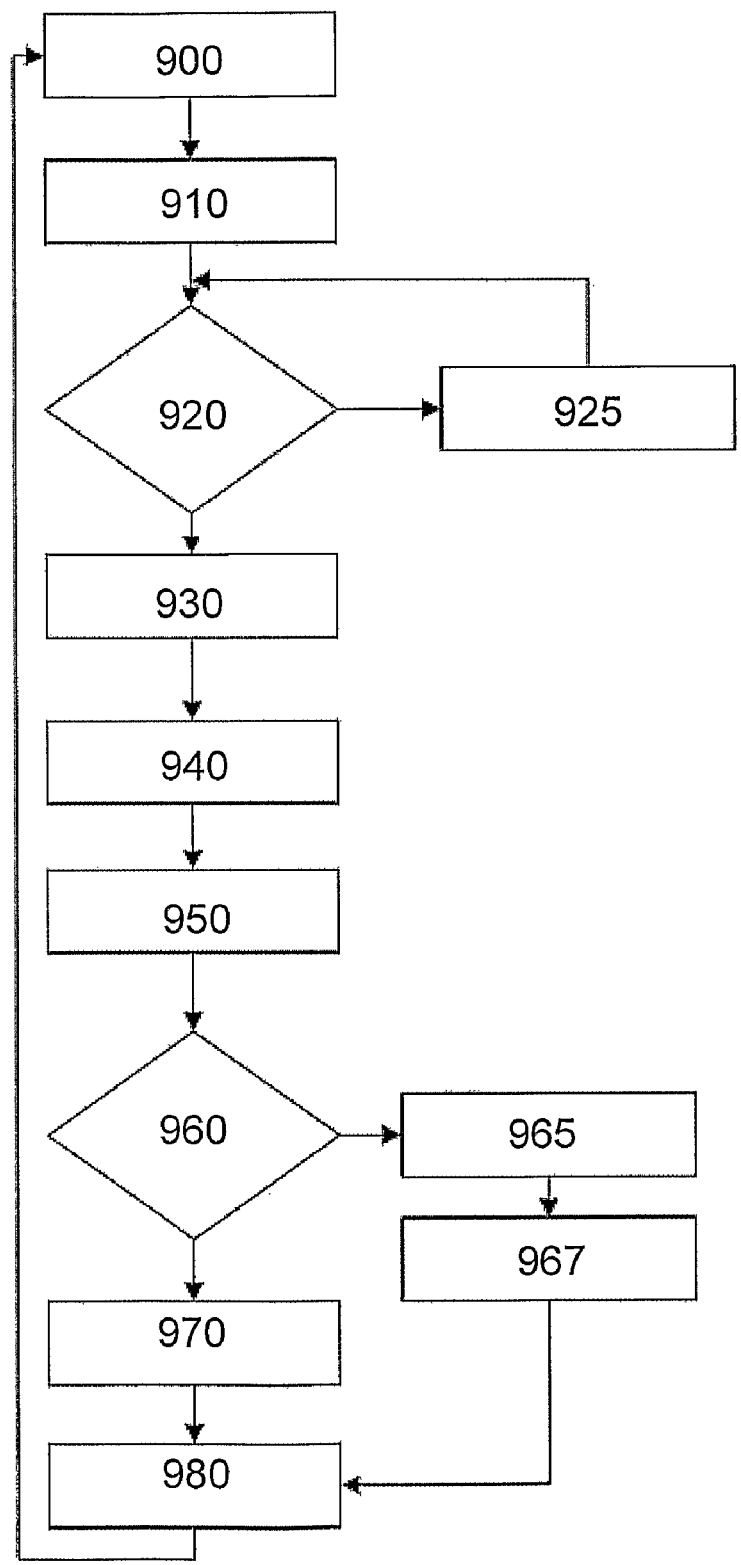
FIG. 9 illustrates flow chart showing the steps taken to schedule resources depending on the path loss for one or more mobile station in the wireless communication according to a sixth embodiment of the method according to the present invention.

FIG. 9 illustrates flow chart showing the steps taken to schedule resources depending on the path loss for one or more mobile station in the wireless communication according to a sixth embodiment of the method according to the present invention At step 900, the base station monitors the contention-based uplink channel. Then, at step 910, the base station 110 calculates the path loss for each mobile station that it has received data from. The path loss for a mobile station may e.g. be defined as the attenuation in dB that the signal from the corresponding mobile station has experienced on its way from the mobile station to the base station 110. In order for the base station to estimate the path loss it needs to know at which power the mobile station is transmitting. This information might be sent together with the resource scheduling request.

If, at step 920, the path loss for one or more mobile stations is higher than a certain predefined value, these mobile stations are assembled into so called contention groups. In this example mobile stations with a path loss above a certain threshold are placed in a "high path loss group" in step 930 and the remaining mobile stations are placed in a "low path loss group" in step 925. It should be mentioned here that the mobile stations may be grouped into more that two contention groups and that there may be more than one threshold against which the path loss of the mobile stations is compared.

At step 940, the base station 110 assigns a non-orthogonal scheduling request channel for each of the contention groups, which in this case, would be one scheduling request channel for the "high path loss group" and one scheduling request channel for the "low path loss group" and transmits that information to each of the mobile stations concerned. In this fashion, each mobile station in the coverage area 120 of the base station 110 will know which contention group it belongs to and which resource scheduling channel it should use when sending its resource scheduling requests.

Next, at step 950, the base station 110 receives a scheduling request from one of the mobile stations assigned to the first or second contention based groups.

Thereafter, at step 960, the base station 110 checks whether path loss for the one or more mobile stations sending the scheduling requests has changed from the measurement obtained at step 920.

If the pass loss has changed the base stations assigns the one or more mobile stations to the other contention group at step 965 and transmits a scheduling grant to the or more mobile stations at step 967.

Thereafter, at step 980, the base station 110 receives data transmitted from the one or more mobile stations.

However, if the base station 110 at step 960 determines that the path loss for the one or more mobile stations sending the scheduling request has not changed since the last measurement at step 920, the base station 110 issues at step 970 a scheduling grant to the one or more mobile station requesting the grant.

Finally, at step 980, the base station 110 receives data transmitted from the one or more mobile stations and returns to the monitoring step 900. In this fashion, power limited users who are located on the cell edge are likely to collide only with users who most probably are also power limited and located at or near the cell edge.

It should be added that besides monitoring the contention-based channel at step 900, the base station 110 also receives data from one or more mobile station which are not colliding on the contention-based channel (not shown).

One may also add that the above described method embodiments are especially suited to be implemented by a computer program stored in a computer memory, i.e. a RAM (Random Access Memory), ROM (Read-only Memory), EEPROM (Electrically Erasable Programmable Read-only Memory) or some other memory suitable for storing the computer program product. The computer program product implementing the method steps of the method embodiments described above may equally be stored on a storage medium, such as a CD-ROM, a DVD, a hard disk or any other medium suitable for data storage.

Finally, it should be mentioned that the embodiments of the present invention described above are for illustrative purposes only and that the invention is only limited by the scope of the accompanying claims.

The invention claimed is:

1. A mobile station for communicating in a wireless communication network, the mobile station comprising:
   at least one receiver and at least one transmitter, for communicating with a base station in the wireless communication network;
   a first unit configured to monitor activity in the wireless communication network;
   a second unit configured to detect collisions in the communication network;
   a third unit configured to determine parameters indicative of a channel quality on a first radio channel; and
   wherein the mobile station is configured to estimate a probability of collisions on the first radio channel based on one or both of the monitored activity and the detected collisions, and further wherein the mobile station is configured to communicate with the base station via a separate radio channel, instead of the first radio channel, when the parameters indicative of the channel quality on the first radio channel fall below a first predefined threshold value, or when the estimated probability of collisions on the first radio channel exceeds a second predefined threshold value.

2. The mobile station of claim 1 wherein, based on the detected collisions, the mobile station is further configured to wait for the base station to establish the separate radio channel for communication between the mobile station and the base station.

3. The mobile station of claim 1 wherein the mobile station is further configured to transmit a resource scheduling request over a RACH (Random Access Channel) to the base station responsive to an unsuccessful establishment of the separate radio channel.

4. The mobile station of claim 1 wherein the separate channel comprises an orthogonal scheduling request channel.

5. The mobile station of claim 1 wherein the separate radio channel comprises a scheduled resource reservation channel.

6. The mobile station of claim 1, wherein said first radio channel is a contention-based scheduling request channel and wherein the mobile station is configured to send a scheduling request on the separate radio channel if the parameters indicative of the channel quality on the contention-based scheduling channel fall below the first predefined threshold value or the estimated probability of collisions on the contention-based scheduling exceeds the second predefined threshold value, and otherwise to send the scheduling request on the contention-based request channel.

7. A mobile station for communicating in a wireless communication network, the mobile station comprising:
   at least one receiver and at least one transmitter, for communicating with a base station in the wireless communication network;
   a first unit configured to monitor activity in the communication network;
   a second unit configured to detect collisions in the communication network;
   a third unit configured to determine parameters indicative of a channel quality on a first radio channel; and
   wherein the mobile station is configured to send resource requests to the base station only when it has data to send in cases where, via the first, second, and third units, it does not detect a problem competing on the first radio channel, and is configured in cases where it detects a problem competing on the first radio channel, to send a resource request to the base station for radio resources it may need in the future, even though the mobile station currently has no data to send.

8. The mobile station of claim 7 wherein the radio resource request comprises a scheduling request.

9. The mobile station of claim 8 wherein the scheduling request comprises a radio resource scheduling request for presumed future radio resource needs.

10. The mobile station of claim 7 further comprising a transmit buffer, and wherein the mobile station is configured to transmit the scheduling request when the transmit buffer for the mobile station is empty.

11. The mobile station of claim 7 wherein the mobile station is configured to:
    check whether there is any data to send to the base station upon receiving a resource scheduling grant from a base station; and
    transmit a new resource scheduling request to the base station upon receiving the resource scheduling grant if there is no data to transmit.

12. The mobile station of claim 11 wherein the new resource scheduling request comprises a message format that is different than the format of the resource request transmitted to the base station with the data.

13. The mobile station of claim 11 wherein the radio resource request transmitted to the base station comprises a priority flag indicating that the mobile station has no more data to send.

14. The mobile station of claim 7 wherein the first radio channel comprises a contention based radio channel.

15. The mobile station of claim 7 wherein the mobile station is located at an edge of a coverage area of a base station.

16. A base station for communicating in a wireless communication network, the base station comprising:
    at least one receiver and at least one transmitter, for communicating with one or more mobile stations;
    a first unit configured to monitor activity in the wireless communication network;
    a second unit configured to detect collisions in the communication network; and
    a third unit configured to determine parameters indicative of a channel quality on a first radio channel to be used by the mobile stations for communicating with the base station; and
    the base station being configured to establish, for use instead of the first radio channel, a scheduled radio channel to a given one of the mobile stations whose channel quality falls below a first predefined threshold value, or whose probability of collisions passes a second predefined threshold value.

17. The base station of claim 16 wherein the scheduled radio channel comprises an orthogonal radio channel with respect to the first radio channel.

18. The base station of claim 16 wherein the base station is further configured to check whether the mobile station has any data to transmit before establishing the scheduled radio channel to the mobile station.

19. The base station of claim 16 wherein the channel quality may be expressed in terms of at least one of a SINR (Signal-to-Interference and Noise Ratio), an ISI (Inter Symbol Interference), a RSSI (Received Signal Strength Indicator), a path loss, a geometry factor, and a parameter indicative of channel quality.

20. A base station for communicating in a wireless communication network, the base station comprising:
    at least one receiver;
    at least one transmitter;
    a first unit configured to monitor activity in the wireless communication network;
    a second unit configured to detect collisions in the wireless communication network; and
    an arrangement configured to determine parameters indicative of a channel quality on a radio channel; and
    the base station being configured to:
        receive data from one or more mobile stations in the wireless communication network; and
        force the one or more mobile stations to delay further data transmissions for a predefined waiting time period after a successful data transmission.

21. The base station of claim 20 wherein the base station is further configured to receive data from another mobile station in the wireless communication network during the predefined waiting time period.

22. The base station of claim 20 wherein the base station is further configured to transmit information indicative of the predefined waiting time period to the one or more mobile stations in the wireless communication network.

23. The base station of claim 20 wherein the base station is further configured to transmit information indicative of the predefined waiting time period directly to each mobile station from which it has successfully received data.

24. The base station of claim 20 wherein the base station transmits information indicative of the predefined waiting time period together with ACK/NACK (Acknowledged/Not Acknowledged) signaling to one or more mobile stations in the wireless communication network.

25. The base station of claim 20 wherein the base station transmits information indicative of the predefined waiting time period on a control channel.

26. The base station of claim 20 wherein the predefined waiting time period comprises a deterministic parameter.

27. The base station of claim 20 wherein the predefined waiting time period comprises a waiting time period that is a random variable.

28. A base station for communicating in a wireless communication network, the base station comprising:
    at least one receiver;
    at least one transmitter;
    a first unit configured to monitor activity in the communication network;
    a second unit configured to:
        calculate parameters indicative of a signal quality for a received signal from one or more mobile stations in the wireless communication network;
        gather one or more of the mobile stations whose signal quality has been measured to be below a first predefined value into at least one first group of mobile stations; and
        gather one or more mobile stations whose signal quality has been measured to be above the first predefined value into at least one second group of mobile stations; and
    the base station being further configured to communicate with the first group of mobile stations on at least one first radio channel, and with the second group of mobile stations on at least one second radio channel.

29. The base station of claim 28 wherein the at least one first and second radio channels comprise contention based channels.

30. The base station of claim 28 wherein the at least one first and second radio channels are orthogonal with respect to each other.

31. The base station of claim 28 wherein the base station is further configured to force the mobile stations of the first group and the mobile stations of the second group to adapt their transmission power so as to even out differences in signal attenuation between the first and second groups.

32. A method of allocating radio resources in a wireless communication network, the method comprising:
    monitoring user traffic on a radio channel;
    gathering parameters indicative of a channel quality on the radio channel for one or more users in the wireless communication network;
    based on the parameters indicative of the channel quality on the radio channel, establishing communication on a separate radio resource with one or more of the users for which the channel quality falls below a predefined threshold;
    receiving resource scheduling requests on the separate radio resource; and
    receiving data transmitted on a granted scheduled radio resource.

33. The method of claim 32 further comprising issuing an orthogonal dedicated resource for the users in the wireless communication network.

34. The method of claim 32 wherein the users in the wireless communication network may only send the resource scheduling requests on the orthogonal dedicated resource.

35. The method of claim 33 wherein issuing an orthogonal dedicated resource comprises issuing one of a persistent scheduling grant and a dedicated channel for the users in the wireless communication network.

36. The method of claim 32 wherein establishing communication on a separate radio resource with one or more of the users for which the channel quality falls below a predefined threshold comprises:
    allowing the users to periodically send a scheduling request on the separate radio resource; and
    monitoring the persistent scheduling radio channel for user scheduled radio resource requests.

37. A method in a mobile station for sending scheduling requests to a base station in a wireless communication network, said method comprising:
    sending scheduling requests to the base station, as needed, on a contention-based scheduling request channel; and
    detecting a problem competing with other mobile stations on the contention-based scheduling request channel and, in response, sending a scheduling request on another radio channel that is separate from the contention-based scheduling request channel.

38. A method in a base station for receiving scheduling requests from mobile stations in a wireless communication network, said method comprising:

monitoring a contention-based scheduling request channel for scheduling requests sent by any one or more of the mobile stations;

detecting a problem with one of the mobile stations competing on the contention-based scheduling request channel and, in response, allocating another radio channel that is separate from the contention-based scheduling request channel, for the mobile station to send a scheduling request.

* * * * *